(12) United States Patent
Sima et al.

(10) Patent No.: US 11,763,801 B2
(45) Date of Patent: Sep. 19, 2023

(54) METHOD AND SYSTEM FOR OUTPUTTING TARGET AUDIO, READABLE STORAGE MEDIUM, AND ELECTRONIC DEVICE

(71) Applicant: NANJING SILICON INTELLIGENCE TECHNOLOGY CO., LTD., Jiangsu (CN)

(72) Inventors: Huapeng Sima, Jiangsu (CN); Zhiqiang Mao, Jiangsu (CN); Xuefei Gong, Jiangsu (CN)

(73) Assignee: NANJING SILICON INTELLIGENCE TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 17/928,072

(22) PCT Filed: Aug. 29, 2022

(86) PCT No.: PCT/CN2022/115454
§ 371 (c)(1),
(2) Date: Nov. 28, 2022

(87) PCT Pub. No.: WO2023/030235
PCT Pub. Date: Mar. 9, 2023

(65) Prior Publication Data
US 2023/0197061 A1    Jun. 22, 2023

(30) Foreign Application Priority Data
Sep. 1, 2021  (CN) .......................... 202111019704.X

(51) Int. Cl.
*G10L 15/06*  (2013.01)
*G10L 15/16*  (2006.01)
*G10L 15/02*  (2006.01)

(52) U.S. Cl.
CPC ............ *G10L 15/063* (2013.01); *G10L 15/02* (2013.01); *G10L 15/16* (2013.01); *G10L 2015/025* (2013.01)

(58) Field of Classification Search
CPC ....... G10L 15/063; G10L 15/02; G10L 15/16; G10L 2015/025; G10L 15/083;
(Continued)

(56) References Cited

U.S. PATENT DOCUMENTS

2020/0273449 A1 *  8/2020  Kumar .................... G10L 15/22
2021/0055778 A1 *  2/2021  Myer ..................... G06N 3/045
(Continued)

FOREIGN PATENT DOCUMENTS

CN       107680597 A       2/2018
CN       110223705 A       9/2019
(Continued)

*Primary Examiner* — Michael Colucci
(74) *Attorney, Agent, or Firm* — Bret E. Field; Bozicevic, Field & Francis LLP

(57) ABSTRACT

Embodiments of the present application provide a method and system for outputting target audio, a readable storage medium, and an electronic device. The method includes: inputting source audio into a phonetic posteriorgram PPG classification network model to obtain a PPG feature vector, where the PPG feature vector is used for indicating a phoneme label corresponding to each frame of the source audio, and the PPG feature vector contains text information and prosodic information of the source audio; inputting the PPG feature vector into a voice conversion network model, and outputting an acoustic feature vector of target audio based on the phoneme label corresponding to the PPG feature vector, where the target audio contains a plurality pieces of audio with different timbres; and inputting the acoustic feature vector of the target audio into a voice coder, and outputting the target audio through the voice coder.

20 Claims, 6 Drawing Sheets

(58) Field of Classification Search
CPC ..... G10L 15/197; G10L 15/144; G10L 15/30;
G10L 25/15; G10L 25/90; G10L 15/1807;
G06F 18/24155
See application file for complete search history.

(56) References Cited

U.S. PATENT DOCUMENTS

| | | | | |
|---|---|---|---|---|
| 2021/0056958 | A1* | 2/2021 | Lugosch | G10L 25/90 |
| 2022/0020361 | A1* | 1/2022 | Wintrode | G06N 3/044 |
| 2022/0180886 | A1* | 6/2022 | Weng | G10L 21/0208 |
| 2022/0310063 | A1* | 9/2022 | Sima | G10L 21/003 |
| 2022/0343895 | A1* | 10/2022 | Tomar | G10L 15/16 |

FOREIGN PATENT DOCUMENTS

| | | | |
|---|---|---|---|
| CN | 111540364 | A | 8/2020 |
| CN | 112017644 | A | 12/2020 |
| CN | 112750446 | A | 5/2021 |
| CN | 113314104 | A | 8/2021 |
| CN | 113724690 | A | 11/2021 |
| CN | 113724718 | A | 11/2021 |

* cited by examiner

METHOD AND SYSTEM FOR OUTPUTTING TARGET AUDIO, READABLE STORAGE MEDIUM, AND ELECTRONIC DEVICE

FIELD OF THE INVENTION

This application relates to the technical field of data processing, and in particular, to a method and system for outputting target audio, a readable storage medium, and an electronic device.

BACKGROUND OF THE INVENTION

The voice conversion technology is to convert speech of a speaker A (a source speaker) into voice of a speaker B (a target speaker). According to a number of target speakers, speech conversion systems may be classified into two types: To One (there is one target speaker) and To Many (there are a plurality of target speakers). During a specific implementation process, the voice conversion system typically uses the following schemes.

I. The automatic speech recognition (ASR for short) technology being in combination with the text to speech (TTS for short): Audio is first converted into text by an ASR model, and the text is sent to a TTS model for the target speaker, so as to be converted for the target speaker.

II. A BNF (Backus-Naur form) feature of the audio (a bottleneck layer) is extracted through a generative adversarial network (GAN for short), and then the BNF feature is restored by a vocoder, to output the audio.

Both the foregoing schemes have relatively serious problems in practice. Regarding scheme I: If ASR recognition is wrong, TTS conversion is necessarily wrong; and if conversion to a plurality of target speakers is required, a plurality of TTS models need to be configured. As a result, consumption is large, and prosody and speech rates of a plurality of TTS are inconsistent. Regarding scheme II: Although an idea of this scheme is simple, it is difficult to ensure model convergence, and an effect stays at an experimental stage.

For a technical problem in the related art that a speech conversion system cannot efficiently and accurately realize speech conversion in a scenario where there are a plurality of target speakers, no effective solution has been proposed.

SUMMARY OF THE INVENTION

Embodiments of the present application provide a method and system for outputting target audio, a readable storage medium, and an electronic device, so as to resolve at least a technical problem in the related art that a speech conversion system cannot efficiently and accurately realize speech conversion in a scenario where there are a plurality of target speakers.

In an embodiment of the present application, a method for outputting target audio is provided, including: inputting source audio into a phonetic posteriorgram PPG classification network model to obtain a PPG feature vector, where the PPG feature vector is used for indicating a phoneme label corresponding to each frame of the source audio, and the PPG feature vector contains text information and prosodic information of the source audio; inputting the PPG feature vector into a voice conversion network model, and outputting an acoustic feature vector of target audio based on the phoneme label corresponding to the PPG feature vector, where the target audio contains a plurality pieces of audio with different timbres; and inputting the acoustic feature vector of the target audio into a voice coder, and outputting the target audio through the voice coder.

In an embodiment of the present application, an apparatus for outputting target audio is further provided, including: an input module, configured to input source audio into a phonetic posteriorgram PPG classification network model to obtain a PPG feature vector, where the PPG feature vector is used for indicating a phoneme label corresponding to each frame of the source audio; a processing module, configured to input the PPG feature vector into a voice conversion network model, and output an acoustic feature vector of target audio based on the phoneme label corresponding to the PPG feature vector, where the target audio contains a plurality pieces of audio with different timbres; and an output module, configured to input the acoustic feature vector of the target audio into a voice coder, and output the target audio through the voice coder.

In an embodiment of the present application, a system for outputting target audio is further provided, including: a phonetic posteriorgram PPG classification network model, configured to output a PPG feature vector corresponding to input source audio, where the PPG feature vector is used for indicating a phoneme label corresponding to each frame of the source audio, and the PPG feature vector contains text information and prosodic information of the source audio; a voice conversion network model, configured to output acoustic feature vectors of at least two pieces of target audio with different timbres based on the phoneme label corresponding to the PPG feature vector; and a voice coder, configured to output the at least two pieces of target audio based on the acoustic feature vectors of the at least two pieces of target audio.

In an embodiment of the present application, a computer readable storage medium is further provided, where a computer program is stored in the storage medium, and the computer program is set to implement the steps in the foregoing method embodiment while being executed.

In an embodiment of the present application, an electronic device is further provided, including a memory and a processor, where a computer program is stored in the memory, and the processor is configured to execute the computer program to implement the steps in the foregoing method embodiment.

According to the embodiments of the present application, the source audio is input into the phonetic posteriorgram PPG classification network model to obtain the PPG feature vector, where the PPG feature vector is used for indicating the phoneme label corresponding to each frame of the source audio, and the PPG feature vector contains the text information and the prosodic information of the source audio; the PPG feature vector is input into the voice conversion network model, and acoustic feature vectors of a plurality pieces of target audio with different timbres are output based on the phoneme label corresponding to the PPG feature vector; and the acoustic feature vector of the target audio is input into the voice coder, and the target audio is output from the voice coder. In this case, the technical problem in the related art that the speech conversion system cannot efficiently and accurately realize speech conversion in a scenario where there are a plurality of target speakers is resolved. The PPG feature vector indicating the phoneme label corresponding to each frame of the source audio is obtained by the PPG classification network model. Subsequently, the acoustic feature vectors of a plurality pieces of target audio with different timbres corresponding to the phoneme label are obtained by the voice conversion network model. Finally, the plurality pieces of target audio with different timbres are output from the voice coder. In this way, speech conversion is efficiently and accurately performed in a scenario where there are a plurality of target speakers.

BRIEF DESCRIPTION OF THE DRAWINGS

The accompanying drawings described herein are used for introducing further understanding of the present application, and constitute a part of the present application. The exemplary embodiments and descriptions of the present application are used to explain the present application, and are not construed improperly as constituting a limitation to the present application. In the accompanying drawings.

DETAILED DESCRIPTION OF THE EMBODIMENTS

This application is described below in detail with reference to the accompanying drawings and in conjunction with the embodiments. It should be noted that the embodiments in the present application and the features in the embodiments may be combined with each other in the case of no conflict.

It should be noted that the terms "first", "second", and the like in this specification, the claims, and the accompanying drawings of the present application are intended to distinguish among similar objects, and do not necessarily indicate a particular sequence or a sequential order.

Speech conversion is to adjust a personality characteristic of speech by changing an acoustic characteristic parameter of a speech signal, so that converted voice of a source speaker sounds like voice of a target speaker. However, if the voice of the source speaker can only be converted into voice of one target speaker, or if the voice is not accurate enough when being converted into voice of a plurality of target speakers, a result is either that a user may hear only one target speaker, or that voice is chaotic in case of conversion into voice of a plurality of target speakers, with a poor conversion effect and uncalrity. As a result, user experience is reduced.

The method in the present application may be used in a hardware device capable of running an instruction, such as a notebook, a desktop computer, a mobile phone, and other hardware devices having a broadcast function. Through implementing the method by running the instruction and playing by the broadcast function of the hardware device, it may be achieved to accurately convert voice of a source speaker into voice of a plurality of target speakers, thereby relieving a phenomena in which user experience is reduced due to single voice conversion.

Figure 1:
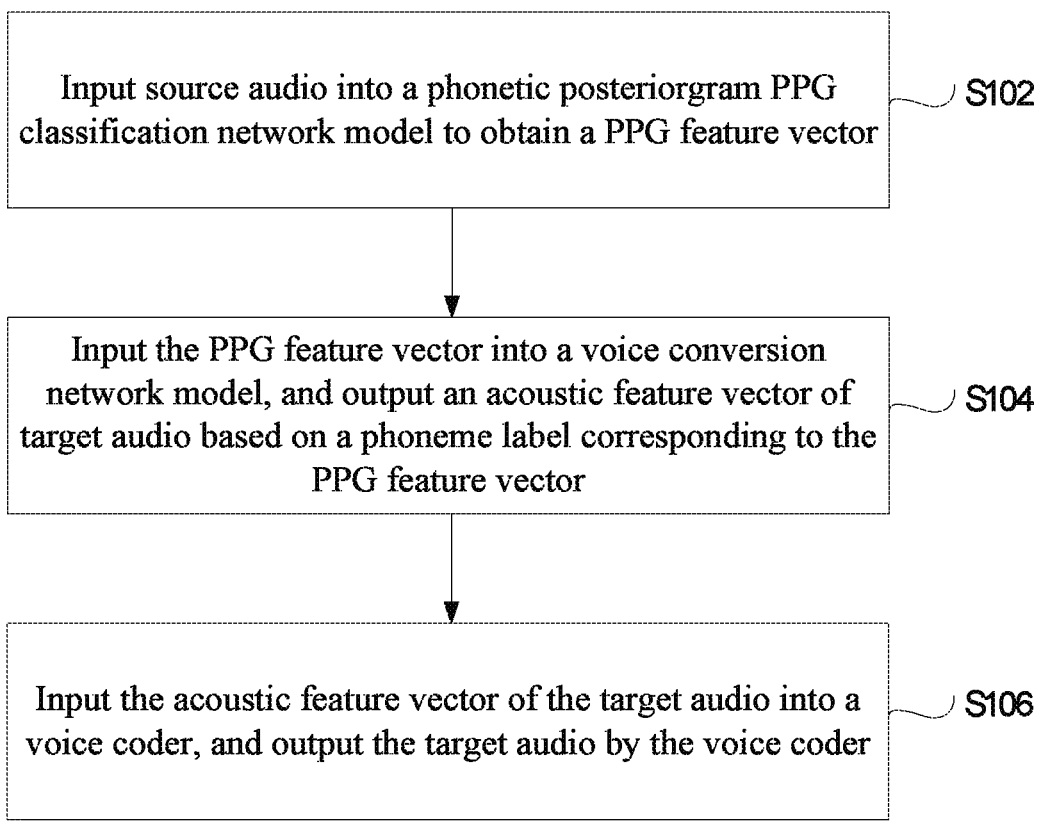
FIG. 1 is a flowchart of a method for outputting target audio according to an embodiment of the present application.

FIG. 1 is a flowchart of a method for outputting target audio according to an embodiment of the present application. As shown in FIG. 1, the method for outputting target audio provided in this embodiment of the present application includes:

Step S102. Input source audio into a phonetic posteriorgram PPG classification network model to obtain a PPG feature vector for indicating a phoneme label corresponding to each frame of the source audio, and the PPG feature vector contains text information and prosodic information of the source audio;

Step S104. Input the PPG feature vector into a voice conversion network model, and output an acoustic feature vector of target audio based on the phoneme label corresponding to the PPG feature vector, where the target audio contains a plurality pieces of audio with different timbres; and Step S106. Input the acoustic feature vector of the target audio into a voice coder, and output the target audio through the voice coder.

It should be noted that: the PPG feature vector indicating the phoneme label corresponding to each frame of the source audio is obtained by the PPG classification network model; subsequently, acoustic feature vectors of a plurality pieces of target audio with different timbres corresponding to the phoneme label are obtained by the voice conversion network model; and finally, the plurality pieces of target audio with different timbres are output from the voice coder. In this way, speech conversion is efficiently and accurately performed in a scenario where there are a plurality of target speakers.

A voice conversion network model based on multi-person conversion of a phonetic posteriorgram PPG feature in this embodiment of the present application may realize voice conversion to a plurality of target speakers through a conversion network. Meanwhile, this embodiment of the present application may further include a conversion module that is configured to carry the PPG classification network model involved in this embodiment of the present application. The conversion module may be disposed in a server or a terminal, which is not limited in this embodiment of the present application.

In addition, this embodiment of the present application may be further equipped with a corresponding sound pickup device and a corresponding sound broadcasting device, such as a microphone and a loudspeaker, which are respectively configured to obtain input audio of a source speaker and output output audio of a target speaker.

There are mainly two training models involved in this embodiment of the present application, which respectively are the PPG classification network model and the voice conversion network model. The trained PPG classification network model needs to be used during training of the voice conversion network model. Therefore, the PPG classification network model needs to be trained first.

In an embodiment, before inputting the source audio into the phonetic posteriorgram PPG classification network model to obtain the PPG feature vector, the method further includes:

establishing the PPG classification network model, where the PPG classification network model includes an abstract mapping layer, a module layer, a PPG layer, and a classification layer that are sequentially connected, and the module layer includes at least two modules connected in series; and training the PPG classification network model by a first training sample, where the first training sample includes a first audio feature and a first phoneme label corresponding to the first audio feature.

Figure 2:
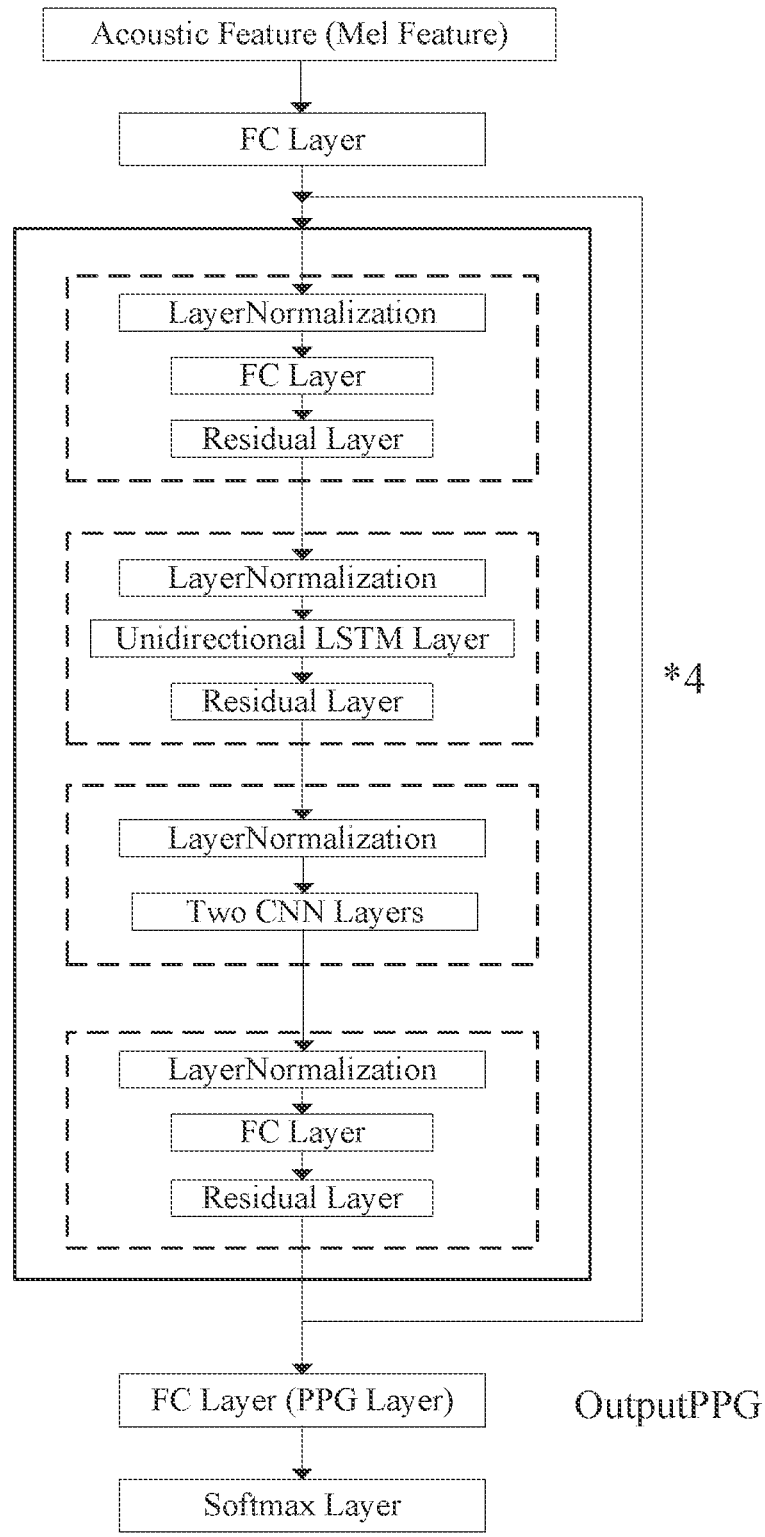
FIG. 2 is a schematic structural diagram of a PPG classification network model according to an embodiment of the present application.

FIG. 2 is a schematic structural diagram of a PPG classification network model according to an embodiment of the present application. As shown in FIG. 2, the PPG classification network model includes: an FC (fully connected) layer (equivalent to the foregoing abstract mapping layer), which is configured to perform first-step abstract mapping on an input feature (a Mel feature); a block (equivalent to the module layer), including an FFM (field-aware factorization machine) layer, a unidirectional LSTM (Long and Short Term Memory, a neural network capable of memorizing long and short term information) layer, a CNN (convolutional neural network) layer, and an FFM layer; a PPG layer; and a softmax classification layer.

In an embodiment, before training the PPG classification network model by the first training sample, the method further includes:

acquiring a first training corpus, where the first training corpus includes first audio and first text corresponding to the first audio;

converting the first audio into a first audio feature, and converting the first text into a first phoneme;

determining a first phoneme label corresponding to each frame of the first audio feature based on an alignment relationship between the first audio and the first text and duration information of the first phoneme, where the first phoneme label is used for identifying a category of the first phoneme; and determining the first audio feature as input of the first training sample, and determining the first phoneme label as output of the first training sample.

It should be noted that, regarding the PPG classification network model, an ASR training corpus is used as a training corpus in this embodiment of the present application, which contains audio and a text label corresponding to the audio. It should be noted that, to facilitate subsequent use, the training corpus herein is not performed with noise reduction or other processing, and is not performed with slicing processing. In this way, when voice conversion is performed by a system that has completed the training, through inputting the corresponding audio into directly the system, corresponding feature extraction may be performed.

In an embodiment, training the PPG classification network model by the first training sample includes:

inputting the first audio feature into the abstract mapping layer, to perform the first-step abstract mapping;

normalizing the first audio feature on each layer of the single first training sample in a channel direction by the module, and then performing a second-step abstract mapping by the abstract mapping layer;

by the module, collecting continuously input information about first audio features from front to back by a linear sequence structure, and extracting global dependency information between the first audio features;

extracting local dependency information between the first audio features by the module;

integrating the global dependency information and the local dependency information, and performing a third-step abstract mapping on the first audio feature;

according to a total number of phoneme categories corresponding to the first phoneme label, classifying output feature vectors performed with the third-step abstract mapping by the PPG layer, to obtain a first PPG feature vector, where dimensions of the first PPG feature vector are consistent with the total number of the phoneme categories, and each dimension of the first PPG feature vector is used for indicating a probability of one phoneme category; and training the PPG classification network model through backpropagation, with the first audio feature as input and the first PPG feature vector as output, until the PPG classification network model is converged.

It should be noted that, in combination with the model structure shown in FIG. 2, the training process of the PPG classification network model is described as follows.

First: An MFA (Montreal Forced Aligner) alignment tool is used to train the training corpus, to generate an alignment duration feature of the corpus (pronunciation duration of a phoneme of the audio), and a phoneme category of each frame of the audio is extracted based on the pronunciation duration of the phoneme.

Second: An acoustic feature (which may be an 80-dimensional mel feature) of the audio is extracted, so as to construct a training sample (input of the sample is X: an 80-dimensional mel feature, and output of the sample is Y: a phoneme category corresponding to each frame of the audio).

Third: A multi-categorization deep network (the PPG classification network model) is built. A schematic structural diagram of a PPG network is shown in FIG. 2. The PPG network firstly includes an FC layer; secondly, includes four blocks, where each block is composed of four sub-modules (the four sub-modules are sequentially: an FFM module, an LSTM module, a CNN module, and an FFM module); connected with a further FC layer; and finally, a softmax classifier. Working modes of each part of the PPG classification network model are described below in detail.

a. The FC layer is configured to perform first-step abstract mapping on the input feature (the Mel feature).

b. Regarding the blocks:

1) The FFM module normalizes each layer of feature of a single sample in the channel direction by a layer normalization layer to accelerate a convergence speed of the model; performs further abstract mapping on the feature by the FC layer; and prevents gradient disappearance caused by deepening of the network by a residual layer.

2) The LSTM module is configured to collect continuously, through a long and short term memory function of an LSTM network, input information from front to back by a linear sequence structure, and learn global dependency information between the features.

3) The CNN module extracts local dependencies between the features by the CNN.

4) The FFM module integrates the extracted global dependency information and local dependency information, to perform abstract mapping.

On the whole, comprehensively considering efficiency and performance for each block, it is better to set a block value to a larger value. However, a too large block value may cause efficiency of network training and inference to be reduced. Therefore, for later streaming use, the block value (the block value refers to a number of sub-modules included in each block) is set to 4 in this embodiment of the present application. a plurality of blocks are in a series structure, and a next block is used for a further feature integration of output features of a previous block.

c. The PPG layer includes an FC layer, and is configured to extract a PPG feature by the FC layer. Specifically, output of the foregoing blocks is classified based on the total number of the phoneme categories, to extract the PPG feature.

A physical meaning of the PPG feature may be understood as the text information and the prosodic information of the audio. Generally, when a same sentence is spoken by different persons, semantic information is the same but timbre information is different. The PPG feature is used to represent a feature with only semantic information and the prosodic information of the audio remaining by removal of the timbre information in the audio. For example, if there are 214 phoneme categories, the PPG feature has 214 dimensions. Specifically, each dimension represents a probability of belonging to this category. During a network training process, the PPG feature actually represents a probability value (between 0 and 1) by which a frame belongs to each phoneme category, which has stronger fault tolerance and generalization as compared with a pure category value.

In this embodiment of the present application, a Mel feature (X) corresponding to each frame of audio in the training corpus is taken as input, and a phoneme category (Y) corresponding to each frame of audio is taken as output, to train the foregoing PPG classification network model through backpropagation, until the PPG classification network model is converged.

Figure 3:
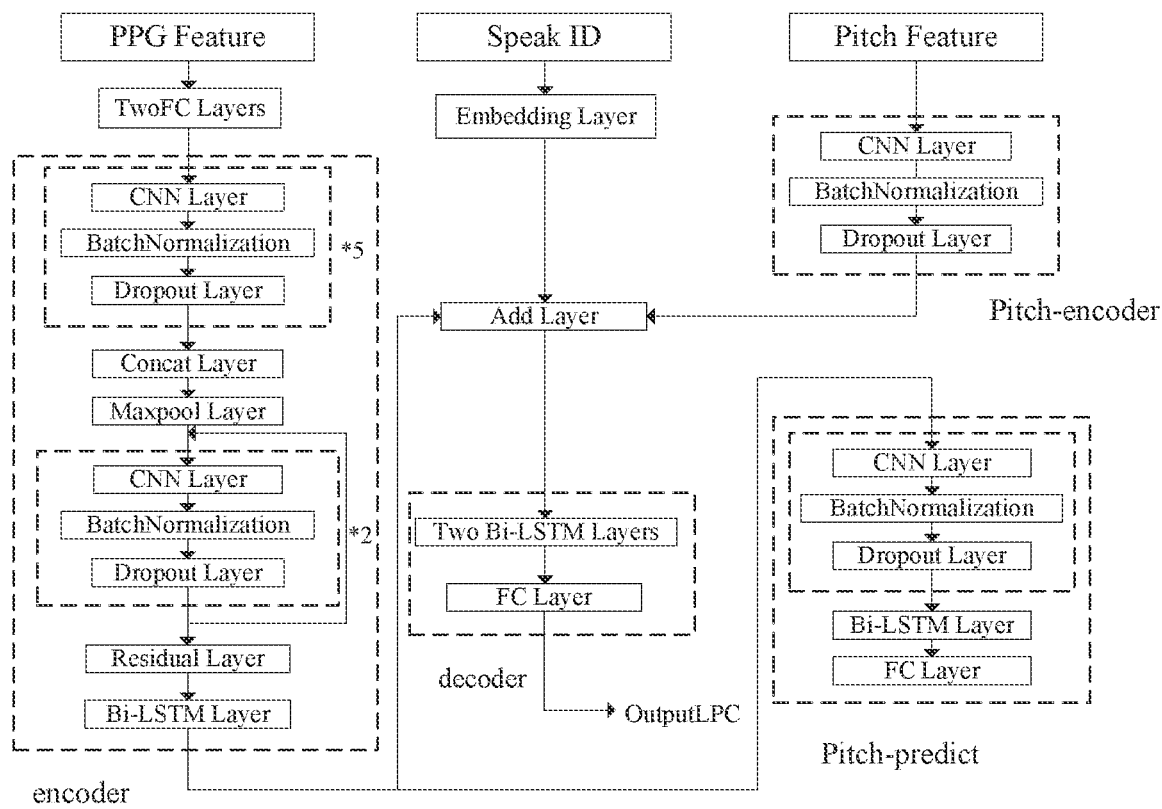
FIG. 3 is a schematic structural diagram of a voice conversion network model according to an embodiment of the present application.

A training process of the voice conversion network model is described below. FIG. 3 is a schematic structural diagram of a voice conversion network model according to an embodiment of the present application. As shown in FIG. 3, the voice conversion network model includes four parts: an encoder (equivalent to an encoding module), a decoder (equivalent to a decoding layer), a pitch-encoder (equivalent to an acoustic wave encoding module), and pitch-predict (equivalent to an acoustic wave prediction layer).

In an embodiment, before inputting the PPG feature vector into the voice conversion network model, and outputting the acoustic feature vector of the target audio based on the phoneme label corresponding to the PPG feature vector, the method further includes:
  establishing the voice conversion network model, where the voice conversion network model includes an encoding layer, a decoding layer, an acoustic wave encoding layer, and an acoustic wave prediction layer; and
  training the voice conversion network model by a second training sample, where the second training sample includes a second PPG feature vector corresponding to second audio and a sample acoustic feature vector corresponding to the second audio, the second audio includes a plurality pieces of audio with different timbres, the voice conversion network model includes a plurality of target identifiers, and each of the target identifiers is used for identifying one timbre.

In an embodiment, before training the voice conversion network model by the second training sample, the method further includes:
  acquiring the second audio;
  inputting the second audio into the trained PPG classification network model to obtain the second PPG feature vector corresponding to the second audio, and determining the second PPG feature vector as input of the second training sample; and
  extracting the sample acoustic feature vector for the second audio performed with cleaning processing, and determining the sample acoustic feature vector as output of the second training sample.

In an embodiment, training the voice conversion network model by the second training sample includes:
  inputting the second PPG feature vector into the encoding layer, and extracting short-term correlation information and long-term correlation information between second PPG feature vectors by the encoding layer;
  integrating the short-term correlation information, the long-term correlation information, a target identifier corresponding to the second PPG feature vector, and acoustic wave information of the second PPG feature vector by the decoding layer, and extracting dependency information between different frames of the second PPG feature vectors;
  extracting abstractly a fundamental frequency feature of the second audio corresponding to the second PPG feature vector by the acoustic wave encoding module, and performing dimension transformation on the extracted fundamental frequency feature, to embed the fundamental frequency feature of the second audio into the voice conversion network model; and
  training the acoustic wave prediction layer by using a feature vector output from the encoding layer as input and using the sample acoustic feature vector as output.

The foregoing training process of the voice conversion network model is described below with reference to FIG. 3.

First: A training sample for the voice conversion network model is prepared, audio of a plurality of target speakers is obtained, and the audio is cleaned (performed with noise reduction, breath removal, standardization, and other processing), to extract acoustic features of the audio of the plurality of speakers. The acoustic feature herein is an LPC feature, and is taken as output (that is, a label) for training the voice conversion network model.

Second: PPG features of the plurality of speakers are obtained, and an 80-dimensional mel feature is extracted from the audio of the plurality of speakers and is sent to the PPG network trained in the third step, to obtain the corresponding PPG feature. The PPG feature is taken as input for training the voice conversion network model.

Third: A deep network (the voice conversion network model) of a multi-person version of VC (voice conversion) is built, and a respective speak ID (equivalent to the target identifier) is identified for each speaker.

As shown in FIG. 3, a specific working mode of the voice conversion network model is as below.

The encoder includes a CNN network and an LSTM network. After PPG features are input by the encoder, the CNN network is configured to extract local information (short-term correlation information) between the PPG features. The LSTM network is configured to extract global information (long-term correlation information) of the PPG features.

The decoder uses a two-layer bidirectional LSTM network to integrate an output feature of the encoder, information about the speak ID, and pitch information (that is, the three types of features are spliced together), and extract dependency information between frames; and further integrates and highly abstracts the features by the FC layer. The information about the speak ID indicates a number of a target speaker, and the pitch information indicates an acoustic waveform or an acoustic feature corresponding to the target speaker.

The pitch-encoder is configured to extract abstractly an F0 feature (the fundamental frequency feature of the audio) of the audio corresponding to the training sample and perform dimension transformation, to embed the F0 feature of the audio of the training sample into the voice conversion network model.

The pitch-predict is configured to take output of the encoder as input of the module and take an LPC (linear predictive coding) feature of the foregoing training sample as output, to train the pitch-predict.

The foregoing LPC feature is a 20-dimensional feature, which generally includes an 18-dimensional BFCC feature and a 2-dimensional pitch feature. An acquisition manner of the foregoing 18-dimensional BFCC features is:

a. converting waveform data into a frequency spectrum through FFT;

b. dividing the frequency spectrum into 18 frequency bands based on a Bark frequency, and calculate energy in each frequency band (weighting by a triangular window, which may also be understood as acquiring a set of different spectra through triangular filtering);

c. performing Log compression on a dynamic range to obtain cepstrum; and d. performing DCT (discrete cosine transform) decorrelation to obtain a final BFCC.

Audio obtained by conversion of the target speaker may be obtained by sending the output (the LPC feature) of the voice conversion network model to the voice coder (for example, an LPC vocoder). The LPC vocoder is an opensource model.

It should be noted that, to implement stream output of the audio obtained by conversion, the source audio may be input into the trained PPG classification network model.

In an embodiment, inputting the source audio into the phonetic posteriorgram PPG classification network model to obtain the PPG feature vector includes:

inputting the source audio data by slices into the phonetic posteriorgram PPG classification network model, where the PPG classification network model includes an abstract mapping layer, a module layer, and a PPG layer that are sequentially connected, the module layer includes at least two modules connected in series, the module is provided with a unidirectional long and short term memory LSTM function layer configured to learn global dependency information between features;

reserving state data of a previous slice of source audio data in the unidirectional LSMT layer by a first cache area, and reserving last n frames of data of the previous slice of source audio data by a second cache area, where each slice of the source audio data includes m frames of data, with 1<n<m; and outputting, based on a current slice of source audio data and the data stored in the first cache area and the second cache area, a PPG feature vector corresponding to the current slice of source audio data.

It should be noted that, each slice of source audio data may include m frames of data, and last n frames of data in the m frames of data may be reserved in the second cache area. For example, one slice of source audio data includes 10 frames of data, of which the last four frames of data are reserved in the second cache area, and may be spliced with a next slice of source audio data when the next slice of source audio data is input.

In an embodiment, outputting, based on the current slice of source audio data and the data stored in the first cache area and the second cache area, the PPG feature vector corresponding to the current slice of source audio data includes:

saving state data of a first slice of source audio data in the unidirectional LSTM layer by the first cache area;

when inferring a second slice of source audio data, initializing the state data in the unidirectional LSTM layer by the first cache area, where the first slice of source audio data and the second slice of source audio data are adjacent slices of data, and the first slice of source audio data is in front;

saving last n frames of data of the first slice of source audio data by the second cache area; and when inferring the second slice of source audio data, splicing the last n frames of data of the first slice of source audio data to be in front of the second slice of source audio data, and then inputting the same into the PPG classification network model.

It should be noted that inputting the source audio by slices into the PPG classification network model, and provision of the cache area are key steps for implementing stream output of the PPG feature.

Figure 4:
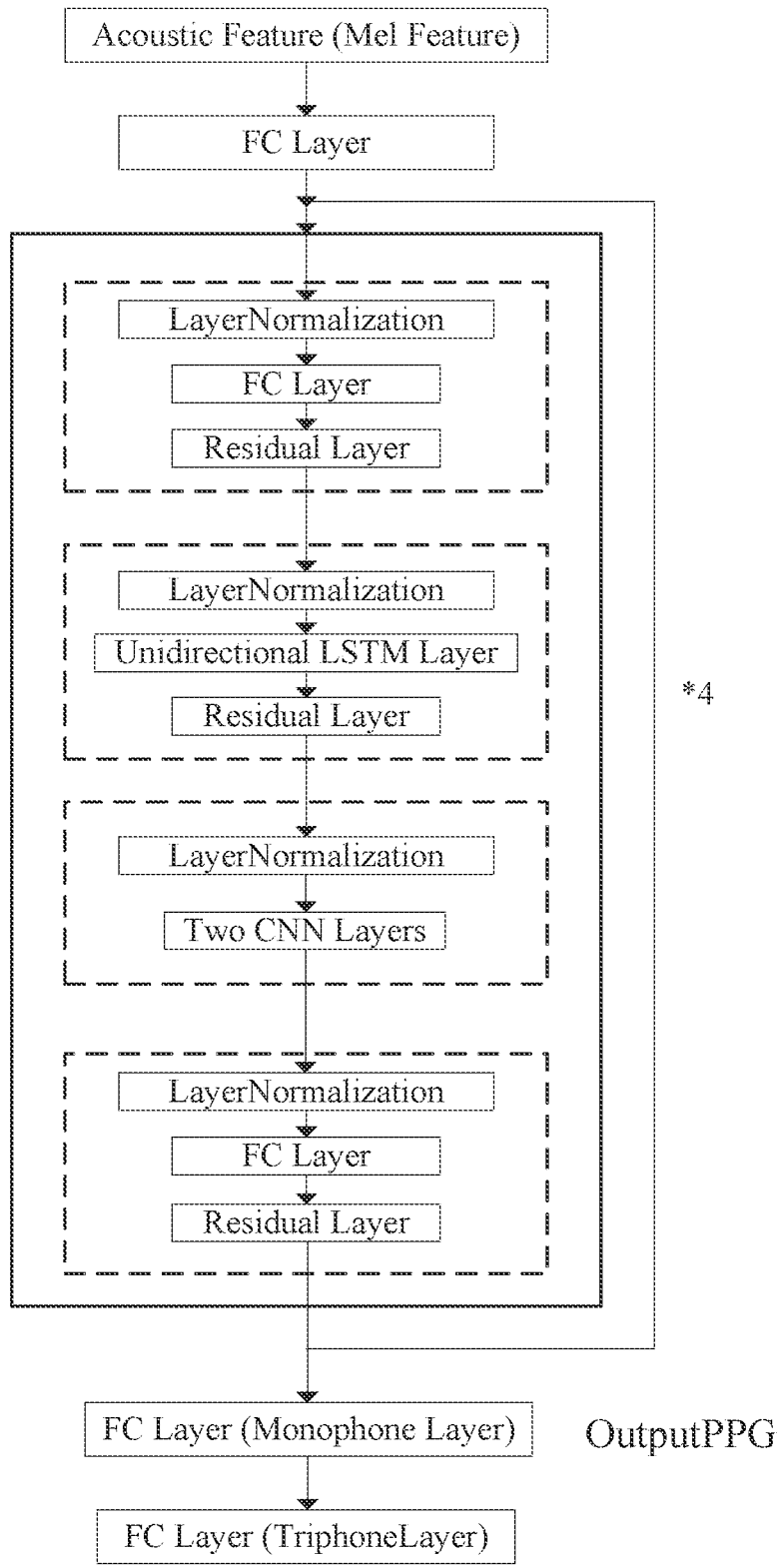
FIG. 4 is a schematic structural diagram of another PPG classification network model according to an embodiment of the present application.

FIG. 4 is a schematic structural diagram of another PPG classification network model according to an embodiment of the present application. As shown in FIG. 4, the PPG classification network model includes: an FC layer (equivalent to the foregoing abstract mapping layer), which is configured to perform first-step abstract mapping on an input feature (a Mel feature); a block (equivalent to the module layer), where the block includes an FFM layer, an LSTM layer, a CNN layer, and an FFM layer; a PPG (monophone) layer; and a PPG (triphone) layer.

In an embodiment, before inputting the source audio into the phonetic posteriorgram PPG classification network model, the method further includes:

establishing the PPG classification network model; and training the PPG classification network model by a training sample, where the training sample includes a sample audio feature and a sample phoneme label corresponding to the sample audio feature.

The stream-extraction PPG feature network in this embodiment of the present application includes a PPG classification network model and cache areas, and the cache areas include a first cache area and a second cache area.

Regarding the PPG classification network model, an ASR training corpus is used as a training corpus in this embodiment of the present application, which contains audio and a text label corresponding to the audio. It should be noted that, to facilitate subsequent use, the training corpus herein is not performed with noise reduction or other processing, and is not performed with slicing processing. In this way, when voice is changed by a system that has completed the training, the corresponding audio may be directly input into the system for corresponding feature extraction.

For training of the model:

First: An MFA (Montreal Forced Aligner) alignment tool is used to train the training corpus, to generate an alignment duration feature of the corpus (pronunciation duration of a phoneme of the audio), and a monophone category and a triphone category of each frame of the audio are extracted based on the pronunciation duration of the phoneme.

It should be noted that a triphone is a kind of phoneme. Different from a monophone (such as t, iy, or n), the triphone is expressed as t–iy+n, that is, is consist of three monophones, being similar to the monophone iy; but a context is considered. To be specific, foregoing description is t and following description is n.

Second: An acoustic feature (which may be an 80-dimensional mel feature) of the audio is extracted, so as to construct a training sample (input of the sample is X: an 80-dimensional mel feature, output of the sample is Y1: a monophone category corresponding to each frame of the audio; and output of the sample is Y2: a triphone category corresponding to each frame of the audio).

Third: A multi-categorization deep network (a PPG network) is built. The schematic structural diagram of the PPG network is shown in FIG. 4. The PPG network firstly includes an FC layer; secondly, includes four blocks, where each block includes four sub-modules (the four sub-modules are sequentially: an FFM layer, an LSTM layer, a CNN layer, and an FFM layer); further includes another FC layer (a monophone layer); and finally, is linked to an FC layer (a triphone layer).

In an embodiment, before training the PPG classification network model by the first training sample, the method further includes:

acquiring a training corpus, where the training corpus includes training audio and training text corresponding to the training audio;

converting the training audio into a training audio feature, and converting the training text into a training phoneme;

determining a monophone label and a triphone label that correspond to each frame of the training audio feature based on an alignment relationship between the training audio and the training text and duration information of the training phoneme, where the monophone label is used for identifying a monophone category of the training phoneme, and the triphone label is used for identifying a triphone category of the training phoneme; and determining the training audio feature as a sample audio feature of the training sample, and determining the monophone label and the triphone label as sample phoneme labels of the training sample.

In an embodiment, training the PPG classification network model by the training sample includes:

inputting the sample audio feature into the abstract mapping layer, to perform first-step abstract mapping;

normalizing the sample audio feature on each layer of the single training sample in a channel direction by the module, and then performing a second-step abstract mapping by the abstract mapping layer;

through the unidirectional LSTM layer of the module, collecting continuously input information about sample audio features from front to back by a linear sequence structure, and extracting global dependency information between the sample audio features;

extracting local dependency information between the sample audio features by a convolutional layer of the module;

integrating the global dependency information and the local dependency information, and performing third-step abstract mapping on the sample audio feature;

according to a total number of monophone categories corresponding to the sample phoneme label, classifying output features performed with the third-step abstract mapping by the monophone layer of the PPG layer, to obtain a first PPG feature, where dimensions of the first PPG feature are consistent with the total number of the monophone categories, and each dimension of the first PPG feature is used for indicating a probability of one monophone category;

according to a total number of triphone categories corresponding to the sample phoneme label, classifying the features performed with the third-step abstract mapping by the triphone layer of the PPG layer, to obtain a second PPG feature, where dimensions of the second PPG feature are consistent with the total number of the triphone categories, and each dimension of the second PPG feature is used for indicating a probability of one triphone category; and train the PPG classification network model through backpropagation by taking the sample audio feature as input and taking the first PPG feature and the second PPG feature as output, until the PPG classification network model is converged.

It should be noted that, functions of various modules of the PPG classification network model are as follows.

The FC layer is configured to perform first-step abstract mapping on the input feature (the Mel feature).

Regarding the blocks:

1) The FFM layer normalizes each layer of feature of a single sample in the channel direction by a layer normalization layer to accelerate a convergence speed of the model; performs further abstract mapping on the feature by the FC layer; and prevents gradient disappearance caused by deepening of the network by a residual layer.

2) The LSTM layer is configured to collect continuously, through a long and short term memory function of an LSTM network, input information from front to back by a linear sequence structure, and learn global dependency information between the features.

3) The CNN layer extracts local dependencies between the features by the CNN, where pad is not performed during a CNN operation.

4) The FFM layer integrates the extracted global dependency information and local dependency information, to perform abstract mapping.

On the whole, comprehensively considering efficiency and performance for each block, it is better to set a block value to a larger value. However, a too large block value may cause efficiency of network training and inference to be reduced. Therefore, for later streaming use, the block value (the block value refers to a number of sub-modules included in each block) is set to 4 in this embodiment of the present application. A plurality of blocks are in a series structure, and a next block is used for a further feature integration of output features of a previous block.

The PPG (monophone) layer includes an FC layer, and is configured to extract the PPG feature by the FC layer. Specifically, output of this layer is subjected to a cross-entropy multi-classification with Y1 based on the total number of the monophone categories, so as to extract the PPG feature.

The PPG (triphone) layer includes an FC layer, and corrects the output of the PPG layer according to the triphone category. Specifically, the output of the monophone layer is classified based on the total number of the triphone categories. Compared with monophone, the triphone has higher fault tolerance and better generalization, but is inconvenient for later use due to a larger dimension. Therefore, serving as a correction to the monophone, the triphone layer improves accuracy of the monophone layer. Specifically, output of this layer is subjected to a cross-entropy multi-classification with Y2 based on the total number of the triphone categories.

In this embodiment of the present application, a Mel feature (X) corresponding to each frame of audio in the training corpus is taken as input, and a phoneme category (Y) corresponding to each frame of audio is taken as output, to train the foregoing PPG classification network model through backpropagation, until the PPG classification network model is converged.

It should be noted that the cache area is mainly used in a model inference process to achieve lossless streaming output. The cache area may be provided in a form of an engineering module independently of the PPG classification network model.

Stream output needs to be realized. Therefore, during model inference, the audio data is input by slices. During connection of pieces, information about a previous slice needs to be used.

The LSTM module of the block needs to be provided with a cache area Cache_lstm_state (where a last state of a previous slice of lstm is reserved). When a next slice of data is inferred, the Cache_lstm_state is used to initialize a state of the LSTM.

The CNN module of the block is not performed with pad during training. During inference, frame loss may be caused, and thus a cache area Cache_cnn (where last few frames of data of the previous slice is reserved) needs to be provided. When a next slice of data is inferred, the Cache_cnn is spliced to be before this piece of data.

Figure 5:
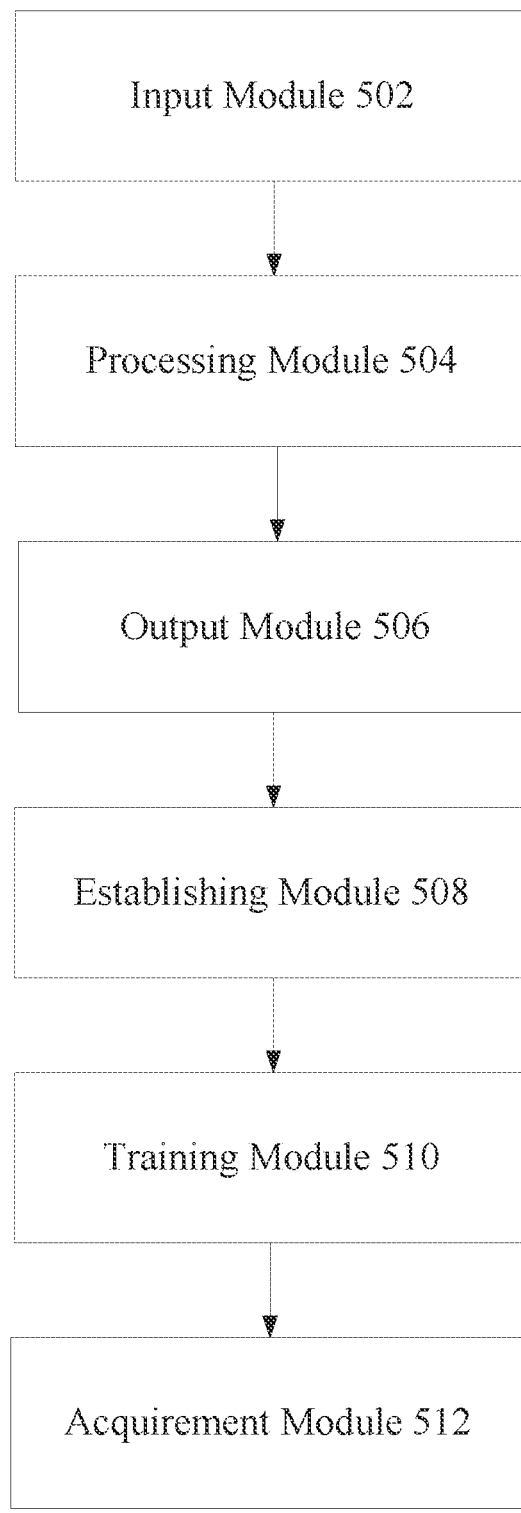
FIG. 5 is a structural block diagram of an apparatus for outputting target audio according to an embodiment of the present application.

As shown in FIG. 5, according to another embodiment of the present application, an apparatus for outputting target audio is further introduced, which is configured to implement the method in any of the foregoing method embodiments. Contents that have been described are not repeated herein. The apparatus includes:

an input module 502, configured to input source audio into a phonetic posteriorgram PPG classification network model to obtain a PPG feature vector, where the PPG feature vector is used for indicating a phoneme label corresponding to each frame of the source audio, and the PPG feature vector contains text information and prosodic information of the source audio;

a processing module 504, configured to input the PPG feature vector into a voice conversion network model, and output an acoustic feature vector of target audio based on the phoneme label corresponding to the PPG feature vector, where the target audio contains a plurality pieces of audio with different timbres;

an output module 506, configured to input the acoustic feature vector of the target audio into a voice coder, and output the target audio through the voice coder;

an establishing module 508, configured to establish the PPG classification network model, where the PPG classification network model includes an abstract mapping layer, a module layer, a PPG layer, and a classification layer that are sequentially connected, and the module layer includes at least two modules connected in series; and a training module 510, configured to train the PPG classification network model by a first training sample, where the first training sample includes a first audio feature and a first phoneme label corresponding to the first audio feature.

The training module 510 is further configured to:
input the first audio feature into the abstract mapping layer, to perform first-step abstract mapping;
normalize the first audio feature on each layer of the single first training sample in a channel direction by the module, and then perform second-step abstract mapping by the abstract mapping layer;
collect continuously, by the module, input information about first audio features from front to back by a linear sequence structure, and extract global dependency information between the first audio features;
extract local dependency information between the first audio features by the module;

integrate the global dependency information and the local dependency information, and perform third-step abstract mapping on the first audio feature;
according to a total number of phoneme categories corresponding to the first phoneme label, classify feature vectors performed with the third-step abstract mapping by the PPG layer, to obtain a first PPG feature vector, where dimensions of the first PPG feature vector are consistent with the total number of the phoneme categories, and each dimension of the first PPG feature vector is used for indicating a probability of one phoneme category; and
train the PPG classification network model through backpropagation by using the first audio feature as input and using the first PPG feature vector as output, until the PPG classification network model is converged.

In an embodiment, the output apparatus further includes an acquirement module 512, configured to: acquire a first training corpus, where the first training corpus includes first audio and first text corresponding to the first audio;
convert the first audio into a first audio feature, and convert the first text into a first phoneme;
determine a first phoneme label corresponding to each frame of the first audio feature based on an alignment relationship between the first audio and the first text and duration information of the first phoneme, where the first phoneme label is used for identifying a category of the first phoneme; and
determine the first audio feature as input of the first training sample, and determine the first phoneme label as output of the first training sample.

In an embodiment, the establishing module 508 is further configured to: establish the voice conversion network model, where the voice conversion network model includes an encoding layer, a decoding layer, an acoustic wave encoding layer, and an acoustic wave prediction layer; and
train the voice conversion network model by a second training sample, where the second training sample includes a second PPG feature vector corresponding to second audio and a sample acoustic feature vector corresponding to the second audio, the second audio includes a plurality pieces of audio with different timbres, the voice conversion network model includes a plurality of target identifiers, and each of the target identifiers is used for identifying one timbre.

In an embodiment, the acquirement module 512 is further configured to: acquire the second audio;
input the second audio into the trained PPG classification network model to obtain the second PPG feature vector corresponding to the second audio, and determine the second PPG feature vector as input of the second training sample; and
extract the sample acoustic feature vector for the second audio performed with cleaning processing, and determine the sample acoustic feature vector as output of the second training sample. In an embodiment, the establishing module 508 is further configured to: input the second PPG feature vector into the encoding layer, and extract short-term correlation information and long-term correlation information between second PPG feature vectors by the encoding layer;
integrate the short-term correlation information, the long-term correlation information, a target identifier corresponding to the second PPG feature vector, and acoustic wave information of the second PPG feature vector by the decoding layer, and extract dependency information between different frames of second PPG feature vectors;

extract abstractly a fundamental frequency feature of the second audio corresponding to the second PPG feature vector by the acoustic wave encoding module, and perform dimension transformation on the extracted fundamental frequency feature, to embed the fundamental frequency feature of the second audio into the voice conversion network model; and train the acoustic wave prediction layer by using a feature vector output from the encoding layer as input and using the sample acoustic feature vector as output.

In an embodiment, the input module 502 is further configured to: input the source audio data by slices into the phonetic posteriorgram PPG classification network model, where the PPG classification network model includes an abstract mapping layer, a module layer, and a PPG layer that are sequentially connected, the module layer includes at least two modules connected in series, the module is provided with a unidirectional long and short term memory LSTM function layer, and the unidirectional LSTM layer is configured to learn global dependency information between features;

reserving state data of a previous slice of source audio data in the unidirectional LSMT layer by a first cache area, and reserving last n frames of data of the previous slice of source audio data by a second cache area, where each slice of the source audio data includes m frames of data, with 1<n<m; and output, based on a current slice of source audio data and the data stored in the first cache area and the second cache area, a PPG feature vector corresponding to the current slice of source audio data.

In an embodiment, the input module 502 is further configured to: save state data of a first slice of source audio data in the unidirectional LSTM layer by the first cache area;

when inferring a second slice of source audio data, initialize the state data in the unidirectional LSTM layer by the first cache area, where the first slice of source audio data and the second slice of source audio data are adjacent slices of data, and the first slice of source audio data is in front;

save last n frames of data of the first slice of source audio data by the second cache area; and when inferring the second slice of source audio data, splice the last n frames of data of the first slice of source audio data to be in front of the second slice of source audio data, and then input the same into the PPG classification network model.

Figure 6:
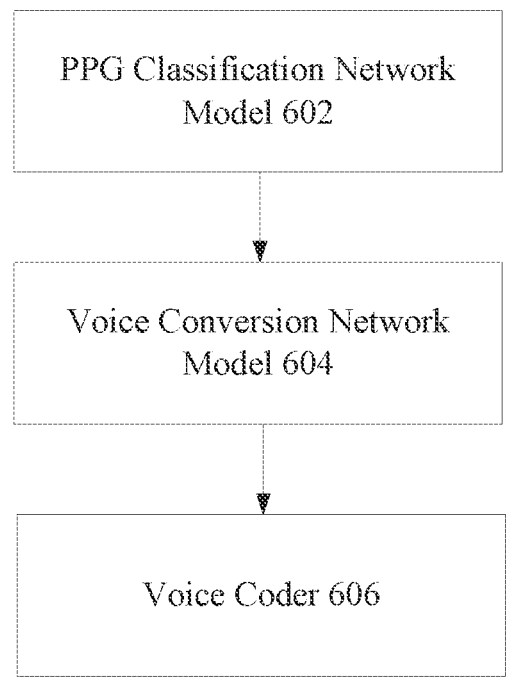
FIG. 6 is a structural block diagram of a system for outputting target audio according to an embodiment of the present application.

As shown in FIG. 6, according to another embodiment of the present application, a system for outputting target audio is further introduced, which is configured to carry the foregoing output apparatus, and includes:

a phonetic posteriorgram PPG classification network model 602, configured to output a PPG feature vector corresponding to input source audio, where the PPG feature vector is used for indicating a phoneme label corresponding to each frame of the source audio, and the PPG feature vector contains text information and prosodic information of the source audio;

a voice conversion network model 604, configured to output acoustic feature vectors of at least two pieces of target audio with different timbres based on the phoneme label corresponding to the PPG feature vector; and a voice coder 606, configured to output the at least two pieces of target audio based on the acoustic feature vectors of the at least two pieces of target audio.

The system for outputting target audio based on the PPG feature in this embodiment of the present application is compared with the related art. On one hand, voice conversion in the related art needs to pass through two networks ASR and TTS that are both very large, resulting in high time consumption. However, compared with the ASR and the TTS, the PPG network and a VC network in this scheme are simplified, so that the networks are smaller and timeliness is better.

On the other hand, for a plurality of speakers, a plurality of TTSs need to be configured in the related art. According to the VC network in this scheme, speech of a source speaker may be converted into speech of a plurality of target speakers. Moreover, by the speak ID, output is specified as speech of a specific speaker On the other hand, in the related art, the audio is converted into text through ASR, where prosodic information (a speaking speed, pitch, and the like) of original audio is lost. In this scheme, the PPG feature is aligned with an audio frame, the prosodic information of the original audio is reserved.

On the other hand, accuracy in the related art depends on accuracy of an ASR system. In this scheme, accuracy is significantly improved by the PPG feature and is not affected by the ASR system. (PPG is actually a probability value, and in combination with a voice conversion system with VC (voice conversion) multi-person training, accuracy of the entire system may be enhanced, where under a data set aidattang_200zh, an error rate of ASR is 15%, and an error rate of a PPG+VC system is 7%).

In addition, the system for outputting target audio based on the PPG feature in this embodiment of the present application may be easily accessed to a human-computer interaction system.

The method for outputting target audio in the embodiment of the present application is described below through an exemplary embodiment.

Training stage:

First, a corpus is selected, where an ASR corpus with precision greater than 98% is selected, audio in a 16-bit way format from about 4000 persons, with a total length of time about 800 hours and a sampling rate of 16 k, being as an original corpus of the classification network. Clean audio of a target speaker is selected. For example, there are 20 persons, and each has 3000 pieces (1 hour) of clean TTS speech, where the sampling rate is 16 k. The audio in a 16-bit way format is taken as an original corpus of the voice conversion network model.

Training of the PPG classification network model:

S1.0. The foregoing original corpus of the PPG classification network model is preprocessed. Specifically, the corpus of the PPG classification network model is enhanced. To generalize representativeness of the original corpus of the PPG classification network model, a form of randomly adding noise is selected to inject various common noise into the original corpus of the PPG classification network model, thereby obtaining enhanced speech of the PPG classification network model. Experiments show that according to this manner, a phoneme feature of the speaker may be successfully obtained, and a voice-changing effect of the speaker may be significantly improved in a subsequent voice-changing stage.

S1.1. The foregoing original corpus of the PPG classification network model is used to train an MFA alignment tool, and duration information of a phoneme in the original corpus of the PPG classification network model is extracted by the trained MFA alignment tool.

It should be noted that, in an enhancing process in the preprocessing stage, only noise is randomly added to the original corpus of the PPG classification network model while duration of the corpus is not changed. Therefore, the duration information of the phoneme in the original corpus of the PPG network in S1.1 may be directly taken as duration information of a phoneme in an enhanced corpus of the PPG classification network model.

S1.2. By the enhanced original corpus of the PPG classification network model, on one hand, audio is converted into a Mel spectrogram feature, such as an 80-dimensional Mel feature; and on the other hand, text corresponding to audio is converted into a phoneme. Specifically, the text is regularized; a number, a letter, and a special symbol thereof are processed, and then are converted into pinyin; and the pinyin is mapped to a phoneme through a phoneme mapping table. It should be noted that, in the foregoing process of converting the text into a phoneme, the text needs to be stretched based on the duration.

S1.3. Because the duration information of the phoneme is known, a corresponding position of the phoneme, that is, start time of each phoneme, in the audio may be obtained. In this way, a phoneme corresponding to each frame of audio is determined based on the start time, so as to finally obtain a phoneme category corresponding to each frame of audio in the audio.

The phoneme category may be understood as that phonemes are encoded, so that each phoneme has a corresponding ID. The ID is a phoneme category, or may be referred to as a phoneme label.

S1.4. The phoneme category corresponding to each frame of audio in S1.3 is used to train the PPG classification network model through backpropagation, until the PPG classification network model is converged. The structure of the PPG classification network model is described above, and is not repeated herein.

Training of the VC (voice conversion) network:

S2.0. The original corpus of the voice conversion network model is regularized.

Subsequently, a mel feature, an LPC feature, and an F0 feature are extracted and are marked as audio features of the target speaker.

S2.1. Through the trained PPG network, a corresponding PPG feature is extracted for the foregoing audio feature (mel) of the target speaker.

S2.2. The VC network is trained by the PPG feature of the target speaker, the corresponding LPC feature and F0 feature, and the speak ID through backpropagation, until the VC network is converged. The structure of the VC network is described above, and is not repeated herein.

S2.3. The LPC feature is output in the previous step, and is restored to audio by connecting an LPC vocoder.

Voice changing stage:

Audio of the source speaker is converted into audio of the target speaker by the trained voice conversion network model. Specifically, the audio of the source speaker is converted into a PPG feature by the foregoing trained PPG network trained, and then the output LPC feature is in the second portion is restored to audio for output from connecting an LPC vocoder.

Figure 7:
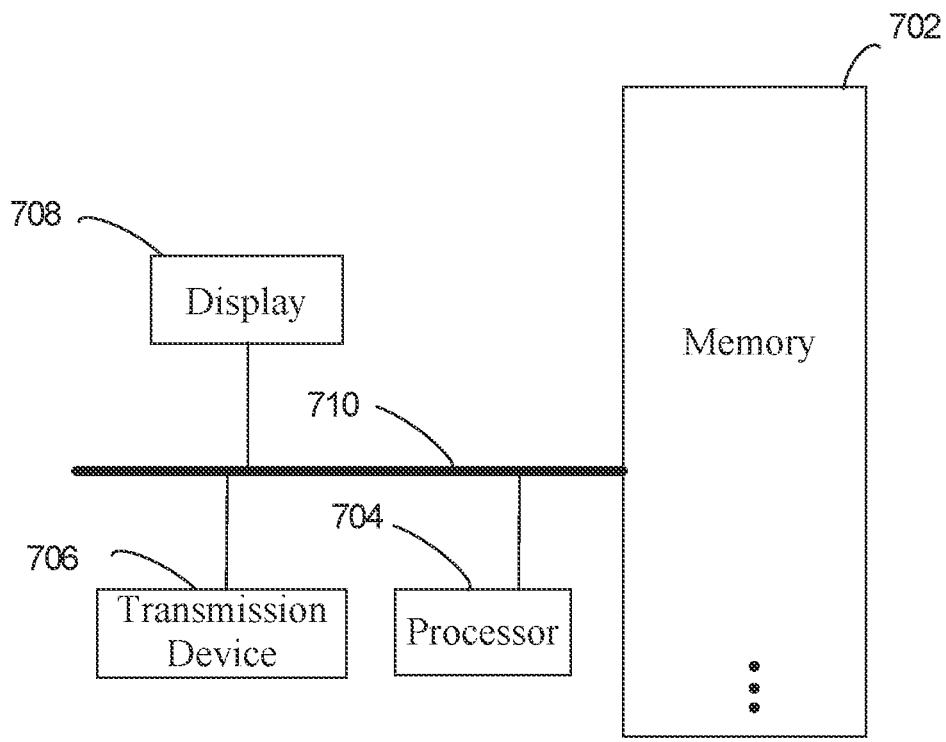
FIG. 7 is a schematic structural diagram of an electronic device according to an embodiment of the present application.

According to still another aspect of an embodiment of the present application, an electronic device for implementing the foregoing method for outputting target audio is further included. The electronic device may be, but is not limited to be applied to a server. As shown in FIG. 7, the electronic device includes a memory 702 and a processor 704. The memory 702 stores a computer program. The processor 704 is configured to perform the steps in any one of the foregoing method embodiments through the computer program.

Optionally, in this embodiment, the electronic device may be located in at least one of a plurality of network devices in a computer network.

Optionally, in this embodiment, the processor may be configured to perform the following steps through the computer program:

S1. Input source audio into a phonetic posteriorgram PPG classification network model to obtain a PPG feature vector, where the PPG feature vector is used for indicating a phoneme label corresponding to each frame of the source audio, and the PPG feature vector contains text information and prosodic information of the source audio;

S2. Input the PPG feature vector into a voice conversion network model, and output an acoustic feature vector of target audio based on the phoneme label corresponding to the PPG feature vector, where the target audio contains a plurality pieces of audio with different timbres; and S3. Input the acoustic feature vector of the target audio into a voice coder, and output the target audio through the voice coder.

Optionally, a person skilled in the art may understand that the structure shown in FIG. 7 is only for example, and the electronic device may also be a terminal device such as a smart phone (such as an Android phone or an iOS phone), a tablet computer, a palmtop computer, a mobile Internet device (MID), or a PAD. FIG. 7 does not constitute a limitation on a structure of the foregoing electronic device. For example, the electronic device may further include more or less components (such as a network interface) than those shown in FIG. 7, or may have a configuration different from that shown in FIG. 7.

The memory 702 may be configured to store software programs and modules, such as program instructions/modules corresponding to the method and the apparatus for outputting target audio in the embodiments of the present application. The processor 704 runs the software programs and the modules that are stored in the memory 702 to implement various function applications and data processing, that is, implement the foregoing method for outputting target audio. The memory 702 may include a high-speed random access memory, and may further include a non-volatile memory, such as one or more magnetic storage devices, a flash memory, or another non-volatile solid-state memory. In some embodiments, the memory 702 may further include memories remotely disposed with respect to the processor 704, and these remote memories may be connected to the mobile terminal through a network. Examples of the foregoing network include, but are not limited to the Internet, an intranet, a local area network, a mobile communications network, and a combination thereof. The memory 702 may be specifically, but is not limited to be configured to store program steps of a speech separation method.

Optionally, a transmission device 706 is configured to receive or send data through a network. Specific examples of the foregoing network may include a wired network and a wireless network. In an example, the transmission device 706 includes a network adapter (network interface controller, NIC), which may be connected to another network device and router through a network cable, to communicate with the Internet or a local area network. In an example, the transmission device 706 is a radio frequency (RF) module, and is configured to communicate with the Internet in a wireless manner.

In addition, the electronic device further includes: a display 708, configured to display a process of outputting the target audio; and a connection bus 710, configured to connect various module components in the electronic device.

An embodiment of the present application further includes a computer readable storage medium. The storage medium stores a computer program, and the computer program is used for performing the steps in any one of the foregoing method embodiments while being executed.

Optionally, in this embodiment, the storage medium may be configured to store the computer program that is configured to perform following steps:

S1. Input source audio into a phonetic posteriorgram PPG classification network model to obtain a PPG feature vector, where the PPG feature vector is used for indicating a phoneme label corresponding to each frame of the source audio, and the PPG feature vector contains text information and prosodic information of the source audio;

S2. Input the PPG feature vector into a voice conversion network model, and output an acoustic feature vector of target audio based on the phoneme label corresponding to the PPG feature vector, where the target audio contains a plurality pieces of audio with different timbres; and S3. Input the acoustic feature vector of the target audio into a voice coder, and output the target audio through the voice coder.

Optionally, the storage medium is further configured to store a computer program that is used for implementing steps included in the method in the foregoing embodiments. This is not repeated in this embodiment.

Merely preferred implementations of the present application are described above. It should be noted that for persons of ordinary skills in the art, improvements and modifications may be made without departing from the principles of the present application, and these improvements and modifications should also be considered as being subject to the protection scope of the present application.

What is claimed is:

1. A method for outputting target audio, comprising:
inputting source audio into a phonetic posteriorgram PPG classification network model to obtain a PPG feature vector for indicating a phoneme label corresponding to each frame of the source audio, and the PPG feature vector contains text information and prosodic information of the source audio;
inputting the PPG feature vector into a voice conversion network model, and outputting an acoustic feature vector of target audio based on the phoneme label corresponding to the PPG feature vector, wherein the target audio contains a plurality pieces of audio with different timbres; and
inputting the acoustic feature vector of the target audio into a voice coder, and outputting the target audio through the voice coder,
wherein before the inputting source audio into a phonetic posteriorgram PPG classification network model to obtain a PPG feature vector, the method further comprises:
establishing the PPG classification network model, wherein the PPG classification network model comprises an abstract mapping layer, a module layer, a PPG layer, and a classification layer that are sequentially connected, and the module layer comprises at least two modules connected in series; and
training the PPG classification network model by a first training sample, wherein the first training sample comprises a first audio feature and a first phoneme label corresponding to the first audio feature; and
the training of the PPG classification network model by the first training sample comprises:
inputting the first audio feature into the abstract mapping layer, to perform a first-step abstract mapping;
normalizing the first audio feature on each layer of the single first training sample in a channel direction by the module, and then performing a second-step abstract mapping by the abstract mapping layer;
collecting continuously, by the module, input information about first audio features from front to back by a linear sequence structure, and extracting global dependency information between the first audio features;
extracting local dependency information between the first audio features by the module;
integrating the global dependency information and the local dependency information, and performing a third-step abstract mapping on the first audio feature;
classifying, by the PPG layer, output feature vectors performed with the third-step abstract mapping according to a total number of phoneme categories corresponding to the first phoneme label, to obtain a first PPG feature vector, wherein dimensions of the first PPG feature vector are consistent with the total number of the phoneme categories, and each dimension of the first PPG feature vector is used for indicating a probability of one phoneme category; and
training the PPG classification network model through backpropagation, with the first audio feature as input and the first PPG feature vector as output, until the PPG classification network model is converged.

2. The method according to claim 1, wherein before the training of the PPG classification network model by first training data, the method further comprises:
acquiring a first training corpus, wherein the first training corpus comprises first audio and first text corresponding to the first audio;
converting the first audio into a first audio feature, and converting the first text into a first phoneme;
determining a first phoneme label corresponding to each frame of the first audio feature based on an alignment relationship between the first audio and the first text and duration information of the first phoneme, wherein the first phoneme label is used for identifying a category of the first phoneme; and
determining the first audio feature as input of the first training sample, and determining the first phoneme label as output of the first training sample.

3. The method according to claim 1, wherein before the inputting of the PPG feature vector into the voice conversion network model, and outputting of the acoustic feature vector of target audio based on the phoneme label corresponding to the PPG feature vector, the method further comprises:
establishing the voice conversion network model, wherein the voice conversion network model comprises an encoding layer, a decoding layer, an acoustic wave encoding layer, and an acoustic wave prediction layer; and
training the voice conversion network model by a second training sample, wherein the second training sample comprises a second PPG feature vector corresponding to second audio and a sample acoustic feature vector corresponding to the second audio, the second audio comprises a plurality pieces of audio with different timbres, the voice conversion network model comprises a plurality of target identifiers, and each of the target identifiers is used for identifying one timbre.

4. The method according to claim 3, wherein before the training of the voice conversion network model by a second training sample, the method further comprises:
acquiring the second audio;
inputting the second audio into the trained PPG classification network model to obtain the second PPG feature vector corresponding to the second audio, and determining the second PPG feature vector as input of the second training sample; and
extracting the sample acoustic feature vector for the second audio performed with cleaning processing, and determining the sample acoustic feature vector as output of the second training sample.

5. The method according to claim 3, wherein the training of the voice conversion network model by the second training sample comprises:
inputting the second PPG feature vector into the encoding layer, and extracting short-term correlation information and long-term correlation information between second PPG feature vectors by the encoding layer;
integrating the short-term correlation information, the long-term correlation information, a target identifier corresponding to the second PPG feature vector, and acoustic wave information of the second PPG feature vector by the decoding layer, and extracting dependency information between different frames of the second PPG feature vectors;
extracting abstractly a fundamental frequency feature of the second audio corresponding to the second PPG feature vector by the acoustic wave encoding module, and performing dimension transformation on the extracted fundamental frequency feature, to embed the fundamental frequency feature of the second audio into the voice conversion network model; and
training the acoustic wave prediction layer by using a feature vector output from the encoding layer as input and using the sample acoustic feature vector as output.

6. The method according to claim 1, wherein the inputting of the source audio into a phonetic posteriorgram PPG classification network model to obtain a PPG feature vector comprises:
inputting the source audio data by slices into the phonetic posteriorgram PPG classification network model, wherein the PPG classification network model comprises an abstract mapping layer, a module layer, and a PPG layer that are sequentially connected, the module layer comprises at least two modules connected in series, the module is provided with a unidirectional long and short term memory (LSTM) function layer configured to learn global dependency information between features;
reserving state data of a previous slice of source audio data in the unidirectional LSTM layer by a first cache area, and reserving last n frames of data of the previous slice of source audio data by a second cache area, wherein each slice of the source audio data comprises m frames of data, with 1<n<m; and
outputting, based on a current slice of source audio data and the data stored in the first cache area and the second cache area, a PPG feature vector corresponding to the current slice of source audio data.

7. The method according to claim 6, wherein the outputting, based on the current slice of source audio data and the data stored in the first cache area and the second cache area, a PPG feature vector corresponding to the current slice of source audio data comprises:
saving state data of a first slice of source audio data in the unidirectional LSTM layer by the first cache area;
when inferring a second slice of source audio data, initializing the state data in the unidirectional LSTM layer by the first cache area, wherein the first slice of source audio data and the second slice of source audio data are adjacent slices of data, and the first slice of source audio data is in front;
saving last n frames of data of the first slice of source audio data by the second cache area; and
when inferring the second slice of source audio data, splicing the last n frames of data of the first slice of source audio data to be in front of the second slice of source audio data, and then inputting the same into the PPG classification network model.

8. A system for outputting target audio, comprising:
a phonetic posteriorgram PPG classification network model, configured to output a PPG feature vector corresponding to input source audio, wherein the PPG feature vector is used for indicating a phoneme label corresponding to each frame of the source audio, and the PPG feature vector contains text information and prosodic information of the source audio;
a voice conversion network model, configured to output acoustic feature vectors of at least two pieces of target audio with different timbres based on the phoneme label corresponding to the PPG feature vector; and
a voice coder, configured to output the at least two pieces of target audio based on the acoustic feature vectors of the at least two pieces of target audio,
wherein the PPG classification network model comprises an abstract mapping layer, a module layer, a PPG layer, and a classification layer that are sequentially connected, the module layer comprises at least two modules connected in series, and a training process of the PPG classification network model comprises:
training the PPG classification network model by a first training sample, wherein the first training sample comprises a first audio feature and a first phoneme label corresponding to the first audio feature; and
the training of the PPG classification network model by a first training sample comprises:
inputting the first audio feature into the abstract mapping layer, to perform first-step abstract mapping;
normalizing the first audio feature on each layer of the single first training sample in a channel direction by the module, and then performing a second-step abstract mapping by the abstract mapping layer;
collecting continuously, by the module, input information about first audio features from front to back by a linear sequence structure, and extracting global dependency information between the first audio features;
extracting local dependency information between the first audio features by the module;
integrating the global dependency information and the local dependency information, and performing a third-step abstract mapping on the first audio feature;
classifying output feature vectors performed with the third-step abstract mapping by the PPG layer according to a total number of phoneme categories corresponding to the first phoneme label, to obtain a first PPG feature vector, wherein dimensions of the first PPG feature vector are consistent with the total number of the phoneme categories, and each dimension of the first PPG feature vector is used for indicating a probability of one phoneme category; and training the PPG classification network model through backpropagation by using the first audio feature as input and using the first PPG feature vector as output, until the PPG classification network model is converged.

9. A computer readable storage medium, wherein a computer program is stored in the storage medium, and the computer program is set to implement the method according to claim 1 while being executed.

10. An electronic device, comprising a memory and a processor, wherein a computer program is stored in the memory, and the processor is configured to execute the computer program to implement the method according to claim 1.

11. A non-transitory computer readable storage medium, wherein a computer program is stored in the storage medium, and the computer program is set to implement the method according to claim 2 while being executed.

12. A non-transitory computer readable storage medium, wherein a computer program is stored in the storage medium, and the computer program is set to implement the method according to claim 3 while being executed.

13. A non-transitory computer readable storage medium, wherein a computer program is stored in the storage medium, and the computer program is set to implement the method according to claim 4 while being executed.

14. A non-transitory computer readable storage medium, wherein a computer program is stored in the storage medium, and the computer program is set to implement the method according to claim 5 while being executed.

15. A non-transitory computer readable storage medium, wherein a computer program is stored in the storage medium, and the computer program is set to implement the method according to claim 6 while being executed.

16. A non-transitory computer readable storage medium, wherein a computer program is stored in the storage medium, and the computer program is set to implement the method according to claim 7 while being executed.

17. An electronic device, comprising a memory and a processor, wherein a computer program is stored in the memory, and the processor is configured to execute the computer program to implement the method according to claim 2.

18. An electronic device, comprising a memory and a processor, wherein a computer program is stored in the memory, and the processor is configured to execute the computer program to implement the method according to claim 3.

19. An electronic device, comprising a memory and a processor, wherein a computer program is stored in the memory, and the processor is configured to execute the computer program to implement the method according to claim 4.

20. An electronic device, comprising a memory and a processor, wherein a computer program is stored in the memory, and the processor is configured to execute the computer program to implement the method according to claim 5.

* * * * *